United States Patent Office 3,038,784
Patented June 12, 1962

3,038,784
PRODUCTION OF AMORPHOUS ALUMINAS
Karl Torkar, Graz, Austria, Oswald Bergmann, Camden, N.J., and Heinrich Egghart, Alexandria, Va., assignors to Peter Spence & Sons Limited, Widner, England, a company of Great Britain, and Deutsche Gold- und Silber-Scheideanstalt vormals Roessler, Frankfurt am Main, Germany, a joint-stock company of Germany
No Drawing. Filed July 1, 1959, Ser. No. 824,171
Claims priority, application Great Britain July 2, 1958
6 Claims. (Cl. 23—143)

This invention is concerned with the production of amorphous aluminas of outstanding purity and stability. Such aluminas are suitable as support material for catalysts, more particularly catalysts used in the oil refining industry. The term "aluminas" is intended to embrace both aluminium oxides and aluminium hydroxides.

Aluminas find application in the chemical industry, pre-eminently in oil working and refining, as a catalyst or catalyst support. For catalytic purposes, it is important not only to have the material in the purest possible state, but with regard to catalytic activity, in the most definite and reproducible form possible. Such a requirement is not confined only to the shape and size of the particles in which the catalyst or support is to be used, but applies also to its modification, through a correct choice of which a known directing of the catalytic process is made possible or improved. Consequently it is to be recommended, in the production of a pure alumina, that the form and composition of the product with regard to the resulting modification of the oxide or hydroxide be not left more or less to chance, but through definite production conditions desired and products of greatest possible uniformity be obtained reproducibly.

According to the present invention a process of producing an amorphous alumina comprising subjecting a pure aluminium alcoholate to hydrolysis by means of high purity water to which slight acidity has been imparted by the addition thereto of an additive which is metal free and which is only weakly dissociated, said hydrolysis medium being substantially free from metal ions and from objectionable anions, e.g. chloride, sulphate.

In the invention the additive is hydrogen peroxide.

Alcoholates of a high degree of purity must be employed if a pure amorphous alumina is to be obtained. One convenient method ensuring the requisite degree of purity comprises preparing the alcoholate from purest aluminium and purest distilled absolute alcohol, the reaction and multiple distillations being effected in silver apparatus.

Similarly, water of the highest degree of purity is preferably employed. This can be obtained conveniently by triple distillation in apparatus including a silver condenser and by storing the distilled water in a closed storage vessel made from polyethylene.

Whilst the presence in the hydrolysis medium of as little as 3% hydrogen peroxide has a significant effect in causing persistence of the amorphous alumina it is preferred to use upwards of 6% hydrogen peroxide. The stability of the amorphous product is such that only when heated to red heat (ca. 700° C.) is there any X-ray detectable crystalline entity.

It is preferred to subject the hydrolysate to a relatively short ageing period, e.g. of the order of two hours or so i.e. from one to three hours. Increasing the ageing period up to five days results in the formation of eta alumina at a temperature some 100° C. lower.

If it is preferred to effect the hydrolysis with 3% hydrogen peroxide, then hydrolysis can conveniently be effected at or about 0° C., i.e. from 0° to 5° C., and under such conditions amorphous alumina will persist up to 700° C. on subsequent heating. With concentrations of hydrogen peroxide of 6% upwards an hydrolysis temperature of 22° C. will be found convenient.

Though the difference presented by adding the alcoholate to the hydrolysis medium in liquid or in powder form is marginal only, use of the liquid form does result in the amorphous alumina persisting to a slightly higher temperature.

Collectively, the best operating conditions are presented if the hydrolysis is effected in the presence of 6% or higher hydrogen peroxide at a temperature of 0° C. and if the ageing period is relatively short.

The invention will now be more particularly described by reference to the hydrolysis of a typical alcoholate, viz. aluminium ethylate in the presence of hydrogen peroxide.

In the succeding tables the following abbreviations have effect:

Bö=boehmite, (Bö)=little boehmite.
By=bayerite, (By)=little bayerite, $((By))_d$=diffuse blackening at the place where later the strong double line of the aluminium trioxide occurs.
am=amorphous.
am—(1.40)=diffuse blackened Debye crystallogram, with a weak diffused line corresponding to $d=1.40$.
am—(eta)=diffuse blackened Debye crystallogram plus two weak diffuse lines corresponding to $d=1.40$ and $d=1.99$.
(eta)=the lines $d=1.40$ and $d=1.99$ are more strongly blackened.
eta—(theta)=a considerable intensity and breadth of the eta line, at $d=2.80$. This indicates a commencement of theta $Al_2O_3$ formation.
(theta)=badly formed theta $Al_2O_3$.

It is to be understood that in referring to alpha, eta and theta aluminas, each has the meaning attributed in Stumpf, H. C., et al., Industrial and Engineering Chemistry 1950, vol. 42, page 1398.

*Hydrogen peroxide.*—The stability of the amorphous alumina will be evident immediately from Table A:

Table A

| 22° C. | 2 hours | 12 hours | 5 days | 20 days | 60 days |
|---|---|---|---|---|---|
| $H_2O$ | Bö+((By))$_d$ | Bö+(By) | By+(Bö) | By+(Bö) | By |
| $H_2O_2$, 3% | am | am | am+(Bö) | am+(Bö) | am+(Bö) |
| $H_2O_2$, 6% | am | am | am | am | am |
| $H_2O_2$, 10% | am | am | am | am | am |
| $H_2O_2$, 15% | am | am | am | am | am |
| $H_2O_2$, 20% | am | am | am | am | am |
| $H_2O_2$, 25% | am | am | am | am | am |
| $H_2O_2$, 30% | am | am | am | am | am |

In order to study the conditions under which the most stable amorphous alumina is produced, hydrolysis of aluminium ethylate was effected with different $H_2O_2$ concentrations, at different temperatures, with different ageing times, and with different methods of delivery of the aluminium ethylate into the hydrolysis medium.

By way of general explanation, the products actually produced were subjected to a heating series, wherein the products concerned were heated up to 400° C. from room temperature within an hour and then kept for 1 hour at 400° C., one hour at 450° C., one hour at 500° C. and so on (with a stepwise temperature increase of 50° C. per hour) to a maximum temperature of 1100° C.

The influence of the concentration of hydrogen peroxide will be evident from Table B. In order to achieve these results aluminium ethylate in pulverulent form was added to four different hydrolysis media, the first representing water only and the other three different concentrations of hydroxide peroxide. Each hydrolysis was effected at 22° C. extending over a period of two hours. After drying over phosphorus pentoxide in a vacuum desiccator the various products were then heated as shown in Table B.

Table B

|  | 0% | 3% | 6% | 30% |
|---|---|---|---|---|
| 400° | (eta) | (eta) | am | am |
| 450° | (eta) | (eta) | am | am—(1.40) |
| 500° | (eta) | (eta) | am—(1.40) | am—(eta) |
| 550° | eta | (eta) | am—(eta) | am—(eta) |
| 600° | eta | eta | am—(eta) | am—(eta) |
| 650° | eta | eta | am—(eta) | am—(eta) |
| 700° | eta | eta | am—(eta) | am—(eta) |
| 750° | eta | eta | eta | eta |
| 800° | eta | eta | eta | eta |
| 850° | eta | eta | eta | eta |
| 900° | eta | eta | eta | eta |
| 950° | eta—(theta) | eta—(theta) | eta | eta |
| 1,000° | (theta) | (theta) | eta | eta |
| 1,050° | (theta)+alpha | (theta)+alpha | eta+alpha | eta+alpha |
| 1,100° | alpha | alpha | alpha | alpha |

It will be seen that at concentrations of 6% hydrogen peroxide and upwards amorphous alumina persists up to 700° C.

The influence of the period of ageing can be discerned from Table C.

Table C

|  | 2 hours | 5 days |
|---|---|---|
| 400° | am | am |
| 450° | am—(1.40) | am—(1.40) |
| 500° | am—(eta) | am—(eta) |
| 550° | am—(eta) | am—(eta) |
| 600° | am—(eta) | am—(eta) |
| 650° | am—(eta) | eta |
| 700° | am—(eta) | eta |
| 750° | eta | eta |
| 800° | eta | eta |
| 850° | eta | eta |
| 900° | eta | eta |
| 950° | eta | eta |
| 1,000° | eta | eta |
| 1,050° | eta+alpha | (theta)+alpha |
| 1,100° | alpha | alpha |

In order to achieve these results aluminium ethylate in pulverulent form was introduced into hydrolysis medium containing 30% hydrogen peroxide, hydrolysed at 22° C. and the products thereafter dried over phosphorous pentoxide in a vacuum desiccator. It will be seen that the amorphous product persists longer when the ageing period is two hours only, pointing to the advantage of using a relatively short ageing period.

The influence of hydrolysis temperature vis-a-vis different concentrations of hydrogen peroxide will be evident from Table D wherein aluminium ethylate in pulverulent form was introduced into 3% and 30% hydrogen peroxide solutions, aged for two hours at 0° C. and 22° C. respectively and the products thereafter dried over phosphorus pentoxide. It will be evident that the temperature of hydrolysis represents a significant factor with respect to the stability of the amorphous product. Thus, using 3% $H_2O_2$ it is clearly advantageous to effect hydrolysis at 0° C. The amorphous product persists up to about 700° C.

Table D

|  | 22° C | | 0° C | |
|---|---|---|---|---|
|  | 30% $H_2O_2$ | 3% $H_2O_2$ | 30% $H_2O_2$ | 3% $H_2O_2$ |
| 400° | am | (eta) | am | am |
| 450° | am—(1.40) | (eta) | am | am |
| 500° | am—(eta) | (eta) | am | am |
| 550° | am—(eta) | (eta) | am | am |
| 600° | am—(eta) | eta | am | am |
| 650° | am—(eta) | eta | am | am |
| 700° | am—(eta) | eta | am—(eta) | am—(1.40) |
| 750° | eta | eta | eta | eta |
| 800° | eta | eta | eta | eta |
| 850° | eta | eta | eta | eta |
| 900° | eta | eta | eta | eta |
| 950° | eta | eta—(theta) | eta | eta |
| 1,000° | eta | (theta) | eta | eta |
| 1,050° | eta | (theta) | eta | eta |
|  | +alpha | +alpha | +alpha | +alpha |
| 1,100° | alpha | alpha | alpha | alpha |

The influence of the physical form of the aluminium ethylate will be apparent from Table E wherein pulverulent and liquid phases are compared. The temperature of hydrolysis was 0° C. and the ageing period was two hours at 0° C.

Table E

|  | Pulverulent | | Liquid | |
|---|---|---|---|---|
|  | 30% $H_2O_2$ | 3% $H_2O_2$ | 30% $H_2O_2$ | 3% $H_2O_2$ |
| 400° | am | am | am | am |
| 450° | am | am | am | am |
| 500° | am | am | am | am |
| 550° | am | am | am | am |
| 600° | am | am | am | am |
| 650° | am | am—(1.40) | am | am |
| 700° | am—(eta) | eta | am—(1.40) | am—(eta) |
| 750° | eta | eta | eta | eta |
| 800° | eta | eta | eta | eta |
| 850° | eta | eta | eta | eta |
| 900° | eta | eta | eta | eta |
| 950° |  | eta |  | eta |
| 1,000° | eta | eta | eta | eta |
| 1,050° | eta | eta | eta | eta |
|  | +alpha | +alpha | +alpha | +alpha |
| 1,100° | alpha | alpha | alpha | alpha |

The present invention thus provides a process whereby an amorphous alumina of very small crystallite size can be obtained which is very suitable for use as a catalyst base.

We claim:

1. A process for producing an amorphous alumina which comprises hydrolyzing a pure aluminum alcoholate with pure water in the presence of hydrogen peroxide at a temperature of from about 0° to 22° C. to form amorphous alumina, said hydrogen peroxide being present in an amount of from 3% to 30% by weight of the water, and drying said amorphous alumina.

2. A process for producing an amorphous alumina which comprises hydrolyzing a pure aluminum alcoholate with pure water in the presence of hydrogen peroxide at a temperature of about 0° to 5° C. to form amorphous alumina, said hydrogen peroxide being present in an amount of 3% by weight of the water, and drying said amorphous alumina.

3. A process for producing an amorphous alumina which comprises hyrolyzing a pure aluminum alcoholate with pure water in the presence of hydrogen peroxide at a temperature of about 0° to 22° C. to form amorphous alumina, said hydrogen peroxide being present in an amount of 30% by weight of the water, and drying the amorphous alumina.

4. A process for producing an amorphous alumina which comprises subjecting pure aluminum alcoholate to hydrolysis at a temperature of from about 0° to 22° C. with a solution of pure water containing from 3 to 30% by weight of hydrogen peroxide, subjecting the hydrolysate to an aging period of from 1 to 3 hours and drying the amorphous alumina which has been formed.

5. The process as defined in claim 4 wherein said aluminum alcoholate is aluminum ethylate.

6. The process as defined in claim 5 wherein said aluminum ethylate is in pulverulent form.

References Cited in the file of this patent

UNITED STATES PATENTS

| | | |
|---|---|---|
| 2,762,782 | Kimberlin et al. | Sept. 11, 1956 |
| 2,859,185 | Kimberlin et al. | Nov. 4, 1958 |

FOREIGN PATENTS

| | | |
|---|---|---|
| 667,145 | Great Britain | Feb. 27, 1952 |

OTHER REFERENCES

Ephraim: "Inorganic Chemistry," Nordeman Publ. Co., Inc., New York, 4th ed., 1943, page 407.